United States Patent
Yu et al.

(10) Patent No.: US 11,929,626 B2
(45) Date of Patent: Mar. 12, 2024

(54) WIRELESS CHARGING METHOD AND ELECTRONIC DEVICE

(71) Applicant: HUAWEI TECHNOLOGIES CO., LTD., Shenzhen (CN)

(72) Inventors: Wenchao Yu, Shanghai (CN); Haizhen Gao, Shanghai (CN); Lvjian Yang, Shanghai (CN); Jiang Chen, Shanghai (CN); Hui Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 535 days.

(21) Appl. No.: 17/278,832

(22) PCT Filed: Sep. 29, 2018

(86) PCT No.: PCT/CN2018/108729
§ 371 (c)(1),
(2) Date: Mar. 23, 2021

(87) PCT Pub. No.: WO2020/062159
PCT Pub. Date: Apr. 2, 2020

(65) Prior Publication Data
US 2022/0037925 A1    Feb. 3, 2022

(51) Int. Cl.
*H02J 50/80* (2016.01)
*H02J 50/12* (2016.01)

(52) U.S. Cl.
CPC .............. *H02J 50/12* (2016.02); *H02J 50/80* (2016.02); *H02J 2310/22* (2020.01)

(58) Field of Classification Search
CPC ...................................................... H02J 50/80
USPC ............................................................ 320/108
See application file for complete search history.

(56) References Cited

U.S. PATENT DOCUMENTS

| | | | |
|---|---|---|---|
| 7,323,964 B1 | 1/2008 | Shyu et al. | |
| 9,397,505 B2 | 7/2016 | Lee et al. | |
| 2012/0161538 A1 | 6/2012 | Kinoshita et al. | |
| 2014/0176055 A1 | 6/2014 | Van Lammeren et al. | |

(Continued)

FOREIGN PATENT DOCUMENTS

| | | |
|---|---|---|
| CN | 102640393 A | 8/2012 |
| CN | 103296705 A | 9/2013 |

(Continued)

OTHER PUBLICATIONS

ITU-T H.264 (Apr. 2017), Series H: Audiovisual and Multimedia Systems, Infrastructure of audiovisual services—Coding of moving video, Advanced video coding for generic audiovisual services, total 812 pages.

*Primary Examiner* — Edward Tso
*Assistant Examiner* — Ahmed H Omar
(74) *Attorney, Agent, or Firm* — Maier & Maier, PLLC

(57) ABSTRACT

A method that includes: transmitting, by an electronic device, a first detecting signal when the electronic device is in a reverse wireless charging mode; receiving, by the electronic device at a gap moment between at least two adjacent moments at which the first detecting signal is transmitted, a second detecting signal transmitted by a wireless charging device; and if the second detecting signal received by the electronic device meets a preset condition, automatically switching, by the electronic device, from the reverse wireless charging mode to a forward wireless charging mode.

20 Claims, 6 Drawing Sheets

(56) References Cited

U.S. PATENT DOCUMENTS

| | | | |
|---|---|---|---|
| 2015/0180284 A1 | 6/2015 | Kang et al. | |
| 2015/0280792 A1 | 10/2015 | Chen et al. | |
| 2016/0268832 A1 | 9/2016 | Chandrakasan et al. | |
| 2017/0133889 A1* | 5/2017 | Yeo | H02J 50/12 |
| 2020/0076239 A1* | 3/2020 | Taniguchi | H02J 50/20 |

FOREIGN PATENT DOCUMENTS

| | | |
|---|---|---|
| CN | 203491797 U | 3/2014 |
| CN | 103762695 A | 4/2014 |
| CN | 104704710 A | 6/2015 |
| CN | 106253396 A | 12/2016 |
| CN | 106787232 A | 5/2017 |
| CN | 106787265 A | 5/2017 |
| CN | 106849387 A | 6/2017 |
| CN | 206673710 U | 11/2017 |
| CN | 107919715 A | 4/2018 |
| CN | 108347080 A | 7/2018 |
| CN | 108419449 A | 8/2018 |
| CN | 108429325 A | 8/2018 |
| CN | 108448670 A | 8/2018 |
| CN | 108494111 A | 9/2018 |
| JP | 2005092555 A | 4/2005 |
| JP | 2013247830 A | 12/2013 |
| JP | 2014222996 A | 11/2014 |
| JP | 2016103121 A | 6/2016 |
| JP | 2017169274 A | 9/2017 |
| JP | 2018029450 A | 2/2018 |
| JP | 2018033245 A | 3/2018 |
| JP | 2018153043 A | 9/2018 |
| RU | 2540896 C2 | 2/2015 |
| RU | 2588579 C2 | 7/2016 |
| RU | 2603009 C2 | 11/2016 |
| RU | 2016104111 A | 9/2017 |
| WO | 2018157672 A1 | 9/2018 |

* cited by examiner

WIRELESS CHARGING METHOD AND ELECTRONIC DEVICE

CROSS-REFERENCE TO RELATED APPLICATIONS

This application is a National Stage of International Application No. PCT/CN2018/108729, filed on Sep. 29, 2018, which is hereby incorporated by reference in its entirety.

TECHNICAL FIELD

The embodiments relate to the field of wireless charging technologies, and in particular, to a wireless charging method and an electronic device.

BACKGROUND

With development of wireless charging technologies, a user may charge an electronic device, such as a mobile phone, in a wireless charging manner. In this way, in a charging process, there is no need to consider an adaptation relationship between a data line and the electronic device, or the like, thereby facilitating use by the user.

For example, a wireless charging technology may include a forward wireless charging mode and a reverse wireless charging mode.

For example, when an electronic device A wirelessly charges an electronic device B, that is, the electronic device A outputs a wireless charging current to the electronic device B, and the electronic device B receives the wireless charging current that is output by the electronic device A, the electronic device A is in the reverse wireless charging mode, and the electronic device B is in the forward wireless charging mode. When the electronic device A is placed on a wireless charging cradle, and the electronic device A receives a wireless charging current that is output by the wireless charging cradle, the electronic device A is in the forward wireless charging mode.

When the electronic device A is in the forward wireless charging mode and receives the charging current that is output by the wireless charging cradle for charging, a manual setting needs to be performed to switch the electronic device A from the forward wireless charging mode to the reverse wireless charging mode, so that the electronic device A can output the wireless charging current to the electronic device B. Similarly, when the electronic device A is in the reverse wireless charging mode and outputs the charging current to charge the electronic device B, a manual setting needs to be performed to switch the electronic device A from the reverse wireless charging mode to the forward wireless charging mode, so that the wireless charging cradle can wirelessly charge the electronic device A. When the electronic device A is in the reverse wireless charging mode, if the electronic device A is not switched from the reverse wireless charging mode to the forward wireless charging mode through manual setting, when the electronic device A is placed on the wireless charging cradle, the electronic device A may still be in the reverse wireless charging mode. Consequently, the electronic device A cannot receive the charging current that is output by the wireless charging cradle and cannot be charged, and it may be considered by mistake that the electronic device A is faulty, thereby affecting wireless charging experience of the user.

SUMMARY

Some embodiments provide a wireless charging method and an electronic device, so that a wireless charging mode of an electronic device can be automatically switched, to improve wireless charging reliability, and improve wireless charging experience of a user.

To achieve the foregoing objective, the embodiments the following solutions:

According to a first aspect, a wireless charging method is provided, and includes: transmitting, by an electronic device, a first detecting signal when the electronic device is in a reverse wireless charging mode, and receiving, at a gap moment between at least two adjacent moments at which the first detecting signal is transmitted, a second detecting signal transmitted by a wireless charging device; and then, if the second detecting signal received by the electronic device meets a preset condition, automatically switching, by the electronic device, from the reverse wireless charging mode to a forward wireless charging mode.

According to the wireless charging method provided in this embodiment, even if the electronic device is in the reverse wireless charging mode, the electronic device may receive, at the gap moment between the moments at which the electronic device transmits the first detecting signal, the second detecting signal transmitted by the wireless charging device, and when the second detecting signal received by the electronic device meets the preset condition, the electronic device can automatically switch from the reverse wireless charging mode to the forward wireless charging mode, so that when the electronic device is in the reverse wireless charging mode, wireless charging of the electronic device is automatically implemented without a manual operation, to improve wireless charging reliability and user experience.

In actual application, for cost consideration, the electronic device is usually provided with only one set of charging apparatuses, for example, a charging circuit including a charging coil. Then, at a same moment, the charging apparatus can work only in the forward wireless charging mode (also referred to as a wireless charging input mode or a receive mode. Further, the charging apparatus charges the electronic device) or the reverse wireless charging mode (also referred to as a wireless charging output mode or a transmit mode. Additionally, the electronic device serves as a power supply party to charge another electronic device).

For example, a transmit frequency of the first detecting signal is a first transmit frequency, and a transmit frequency of the second detecting signal is a second transmit frequency. In a possible method, the first transmit frequency is different from the second transmit frequency, and the first transmit frequency is not an integer multiple of the second transmit frequency. In this way, there is definitely a case in which the charging apparatus of the electronic device is idle (does not transmit the first detecting signal) when the wireless charging device transmits the second detecting signal. Therefore, the electronic device may receive, at the gap moment between the moments at which the electronic device transmits the first detecting signal, the second detecting signal transmitted by the wireless charging device.

In a possible method, the preset condition may include at least one of the following: a voltage of the second detecting signal received by the electronic device is greater than a first voltage threshold; a current of the second detecting signal received by the electronic device is greater than a first current threshold; or a power of the second detecting signal received by the electronic device is greater than a first power threshold.

It should be noted that the first voltage threshold, the first current threshold, and the first power threshold may be preset based on an actual requirement for wireless charging, for example, a battery capacity or a charging power. Details are not described in the embodiments.

To improve accuracy of a result of determining the preset condition and avoid misdetermining, a smallest quantity of times that the preset condition is met in a preset time may be further limited. Therefore, in another possible method, the preset condition may alternatively include at least one of the following: a quantity of times that a voltage of the second detecting signal received by the electronic device in the preset time is greater than a first voltage threshold is greater than a first time quantity threshold; a quantity of times that a current of the second detecting signal received by the electronic device in the preset time is greater than a first current threshold is greater than a second time quantity threshold; or a quantity of times that a power of the second detecting signal received by the electronic device in the preset time is greater than a first power threshold is greater than a third time quantity threshold.

It should be noted that the preset time, the first time quantity threshold, the second time quantity threshold, and the third time quantity threshold may be preset based on an actual requirement for wireless charging, for example, a battery capacity or a charging power. Details are not described in the embodiments.

In a possible method, if the second detecting signal received by the electronic device meets the preset condition, the wireless charging method may further include: transmitting, by the electronic device, a response signal to the wireless charging device; and correspondingly, receiving, by the wireless charging device, the response signal transmitted by the electronic device. The response signal carries indication information, and the indication information is used to indicate that the second detecting signal received by the electronic device meets the preset condition.

Optionally, after the wireless charging device receives the response signal transmitted by the electronic device, the wireless charging device may start to charge the electronic device. For example, the wireless charging method may further include: transmitting, by the wireless charging device, a charging signal to the electronic device; and receiving, by the electronic device, the charging signal transmitted by the wireless charging device.

Optionally, a transmit power of the charging signal is greater than a transmit power of the second detecting signal; and/or a transmit frequency of the charging signal is greater than the second transmit frequency.

According to a second aspect, an electronic device is provided, and includes a transmitting module, a receiving module, and a processing module. The transmitting module is configured to transmit a first detecting signal when the electronic device is in a reverse wireless charging mode. The receiving module is configured to receive, at a gap moment between at least two adjacent moments at which the first detecting signal is transmitted, a second detecting signal transmitted by a wireless charging device. The processing module is configured to: if the second detecting signal received by the receiving module meets a preset condition, automatically switch the electronic device from the reverse wireless charging mode to a forward wireless charging mode.

For example, a transmit frequency of the first detecting signal is a first transmit frequency, and a transmit frequency of the second detecting signal is a second transmit frequency. In a possible method, the first transmit frequency is different from the second transmit frequency, and the first transmit frequency is not an integer multiple of the second transmit frequency.

In a possible method, the preset condition includes at least one of the following: a voltage of the second detecting signal received by the electronic device is greater than a first voltage threshold; a current of the second detecting signal received by the electronic device is greater than a first current threshold; or a power of the second detecting signal received by the electronic device is greater than a first power threshold.

In another possible method, the preset condition includes at least one of the following: a quantity of times that a voltage of the second detecting signal received by the electronic device in a preset time is greater than a first voltage threshold is greater than a first time quantity threshold; a quantity of times that a current of the second detecting signal received by the electronic device in a preset time is greater than a first current threshold is greater than a second time quantity threshold; or a quantity of times that a power of the second detecting signal received by the electronic device in a preset time is greater than a first power threshold is greater than a third time quantity threshold.

In a possible method, the transmitting module is further configured to transmit a response signal to the wireless charging device. The response signal carries indication information, and the indication information is used to indicate that the second detecting signal received by the electronic device meets the preset condition.

Optionally, the receiving module is further configured to: after the transmitting module transmits the response signal to the wireless charging device, receive a charging signal transmitted by the wireless charging device. Optionally, a transmit power of the charging signal is greater than a transmit power of the second detecting signal; and/or a transmit frequency of the charging signal is greater than the second transmit frequency.

According to a third aspect, a chip is provided, and includes a processor and a communications interface. The processor is configured to: read and run a computer program stored in a memory, to implement the wireless charging method according to any one of the first aspect and the implementations of the first aspect.

According to a fourth aspect, an electronic device is provided, and includes a processor, a transceiver, and a memory. The memory is configured to store one or more programs, the one or more programs include a computer executable instruction, and when the electronic device runs, the processor executes the computer executable instruction stored in the memory, so that the electronic device controls the transceiver to perform the wireless charging method according to any one of the first aspect and the implementations of the first aspect.

According to a fifth aspect, a computer readable storage medium is provided, and stores a computer instruction. When the computer instruction is run on a computer, the computer program is enabled to perform the wireless charging method according to any one of claims 1 to 7.

According to a sixth aspect, a computer program product is provided, and includes computer program code. When the computer program code is run on a computer, the computer is enabled to perform the wireless charging method according to any one of the first aspect and the implementations of the first aspect.

According to a seventh aspect, a wireless charging system is provided, and includes a wireless charging device, and the electronic device according to any one of the second aspect and the implementations of the second aspect, or the electronic device according to any one of the fourth aspect and the implementations of the fourth aspect.

In the embodiments, names of units and modules in the electronic device do not constitute a limitation on the device. In actual implementation, these units and modules may have other names, provided that functions of the unit modules are similar to those in the embodiments.

DETAILED DESCRIPTION OF THE EMBODIMENTS

The following describes, in detail with reference to the accompanying drawings, a wireless charging method and an electronic device that are provided in some embodiments.

Figure 1A:
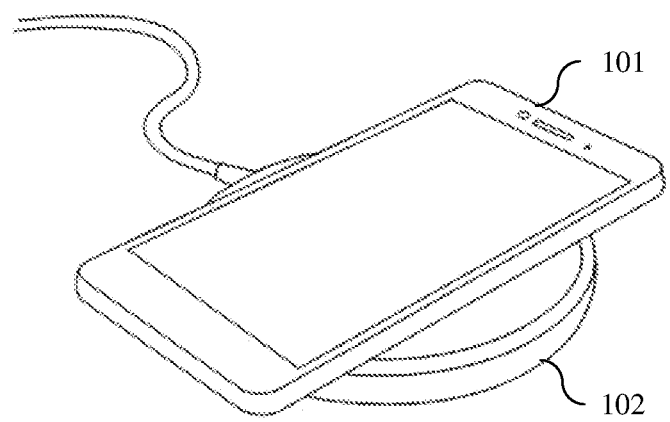
FIG. 1A is a schematic structural diagram 1 of a wireless charging system according to an embodiment.

The wireless charging method provided in the embodiments may be applied to a wireless charging system shown in FIG. 1A.

As shown in FIG. 1A, the wireless charging system may include a first electronic device 101 and a wireless charging device 102. The wireless charging device 102 is configured to wirelessly charge the first electronic device 101.

For example, when the wireless charging device 102, such as a wireless charging base, detects that the to-be-charged first electronic device 101 is placed on a charging panel of the wireless charging device 102, the wireless charging device 102 transmits a charging signal to the first electronic device 101, to wirelessly charge the first electronic device 101.

The wireless charging device 102 may detect the first electronic device 101 by transmitting a detecting signal and receiving a response signal for the detecting signal. For example, the wireless charging device 102 transmits the detecting signal. When the wireless charging device 102 receives the response signal sent by the first electronic device 101 in response to the detecting signal, the wireless charging device 102 may determine that the first electronic device 101 is detected. Then, the wireless charging device 102 may transmit the charging signal to wirelessly charge the first electronic device 101.

The detecting signal is a wireless signal that is periodically sent by a transmitting coil of the wireless charging base at a specific time interval or is periodically sent according to a specific rule and that is used to detect whether an electronic device that needs to be charged exists nearby.

Correspondingly, the response signal is a signal sent by the first electronic device 101 to the wireless charging device 102 after the first electronic device 101 receives the detecting signal. For example, when a strength such as a current, a voltage, or a power of the detecting signal received by the first electronic device 101 is greater than a preset strength threshold, it is considered that the first electronic device 101 and the wireless charging device 102 meet a wireless charging condition. For example, the first electronic device 101 and the wireless charging device 102 are in an "alignment" state. "Alignment" means that a distance between a receiving coil of the first electronic device 101 and a transmitting coil of the wireless charging device 102 is less than a preset distance. Correspondingly, "deviation" means that the distance between the receiving coil of the first electronic device 101 and the transmitting coil of the wireless charging device 102 is greater than the preset distance.

In the wireless charging system shown in FIG. 1A, the wireless charging device 102 is a power supply party and works in a reverse wireless charging mode (also referred to as a wireless charging transmit mode or a wireless charging output mode). Correspondingly, the first electronic device 101 is a power receiving party and works in a forward wireless charging mode (also referred to as a wireless charging receive mode or a wireless charging input mode).

In actual application, the first electronic device 101 may alternatively serve as a power supply party to wirelessly charge another electronic device.

Figure 1B:
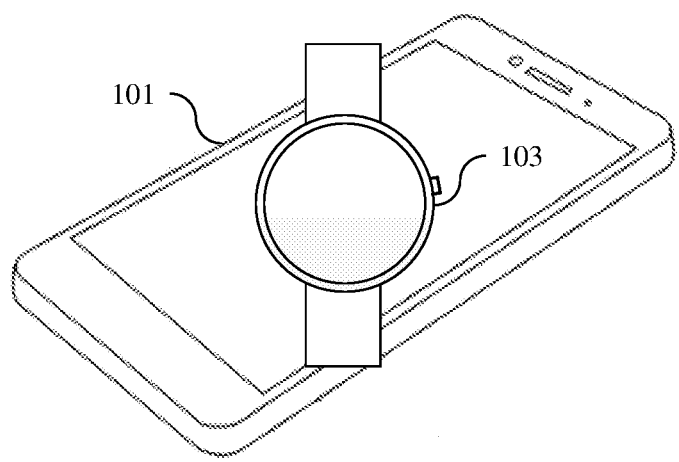
FIG. 1B is a schematic structural diagram 2 of a wireless charging system according to an embodiment.

FIG. 1B is another schematic diagram of a scenario of a wireless charging system to which a first electronic device 101 is applicable according to an embodiment. As shown in FIG. 1B, the first electronic device 101 serves as a power supply party to wirelessly charge a second electronic device 103 such as a smartwatch.

In the wireless charging system shown in FIG. 1B, the first electronic device 101 is configured to transmit a detecting signal; the second electronic device 103 is configured to: receive the detecting signal, and send a response signal for the detecting signal; the first electronic device 101 receives the response signal sent by the second electronic device 103 in response to the detecting signal; the first electronic device 101 transmits a charging signal to the second electronic device 103; and the second electronic device 103 receives the charging signal transmitted by the first electronic device 101.

For example, the first electronic device 101 may be an electronic device that supports a wireless charging function and a wireless discharging function such as a tablet computer (Pad), a notebook computer, a smartphone, a virtual reality (VR) device, an augmented reality (AR) device, a vehicle-mounted device, or an intelligent wearable device.

It should be noted that the first electronic device 101 works in a forward wireless charging mode in the wireless charging scenario shown in FIG. 1A and works in a reverse wireless charging mode in the wireless charging scenario shown in FIG. 1B. When the first electronic device 101 switches between the wireless charging scenario shown in FIG. 1A and the wireless charging scenario shown in FIG. 1B, a wireless charging mode of the first electronic device 101 usually needs to be manually switched, and operations are relatively cumbersome. If the first electronic device 101 in the reverse wireless charging mode is placed on the charging panel of the wireless charging device 102, the first electronic device 101 is still in the reverse wireless charging mode, and the first electronic device 101 does not receive the detecting signal transmitted by the wireless charging device 102. Consequently, a normal wireless charging connection cannot be established, and the first electronic device 101 cannot be wirelessly charged.

Figure 2A:
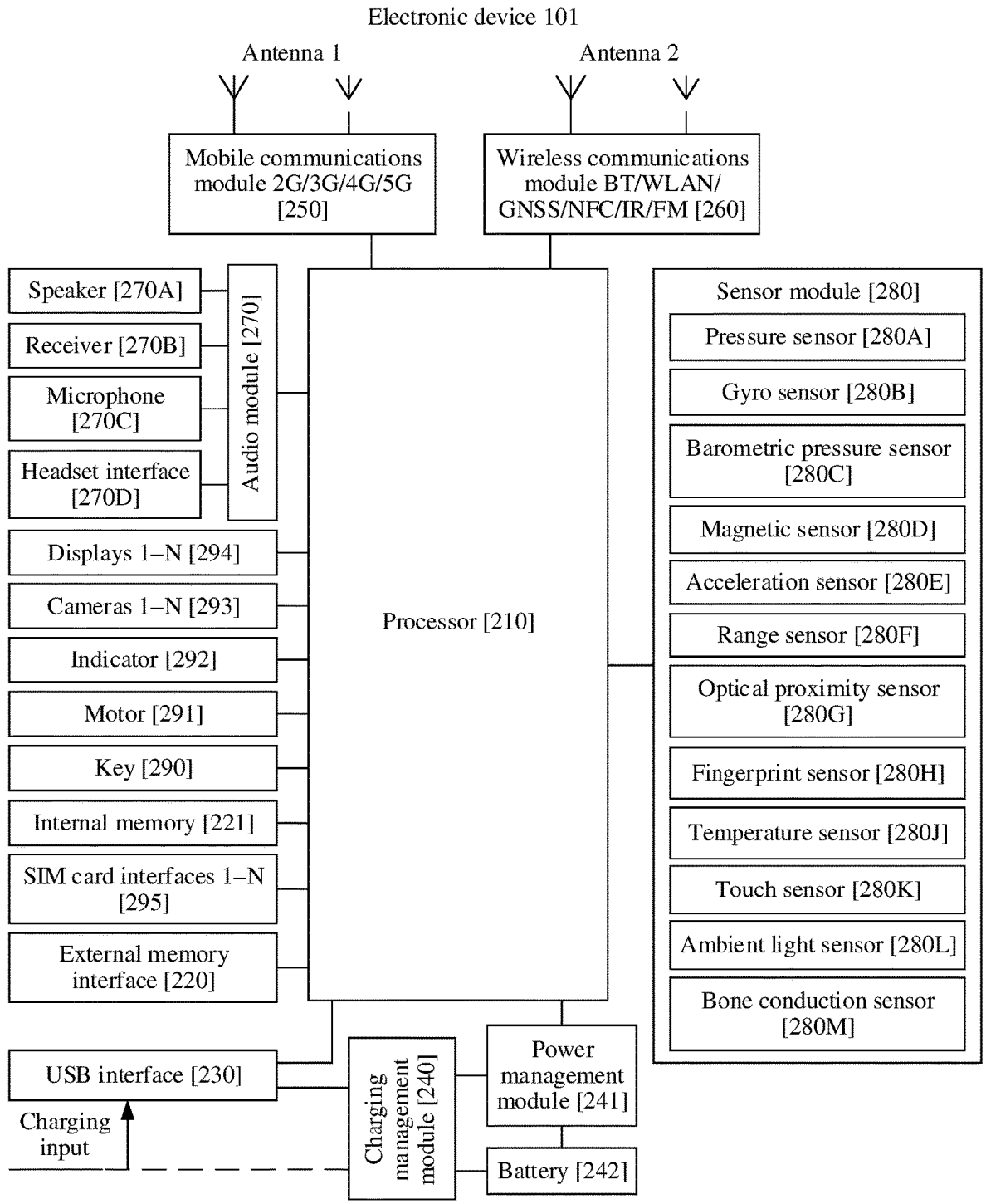
FIG. 2A is a schematic diagram of a hardware structure of an electronic device according to an embodiment.

FIG. 2A is a schematic diagram of a hardware structure of an electronic device 101.

The electronic device 101 may include a processor 210, an external memory interface 220, an internal memory 221, a universal serial bus (USB) interface 230, a charging management module 240, a power management module 241, a battery 242, an antenna 1, an antenna 2, a mobile communications module 250, a wireless communications module 260, an audio module 270, a speaker 270A, a receiver 270B, a microphone 270C, a headset jack 270D, a sensor module 280, a key 290, a motor 291, an indicator 292, a camera 293, a display 294, a subscriber identification module ( ) card interface 295, and the like. The sensor module 280 may include a pressure sensor 280A, a gyro sensor 280B, a barometric pressure sensor 280C, a magnetic sensor 280D, an acceleration sensor 280E, a range sensor 280F, an optical proximity sensor 280G, a fingerprint sensor 280H, a temperature sensor 280J, a touch sensor 280K, an ambient light sensor 280L, a bone conduction sensor 280M, and the like.

It may be understood that a structure illustrated in this embodiment does not constitute a limitation on the electronic device 101. In some other embodiments, the electronic device 101 may include more or fewer components than those shown in the figure, or combine some components, or split some components, or have different component arrangements. The components in the figure may be implemented by using hardware, software, or a combination of software and hardware.

The processor 210 may include one or more processing units. For example, the processor 210 may include an application processor (AP), a modem processor, a graphics processing unit (GPU), an image signal processor (ISP), a controller, a memory, a video codec, a digital signal processor (DSP), a baseband processor, and/or a neural network processing unit (NPU). Different processing units may be independent devices or may be integrated into one or more processors.

The controller may generate an operation control signal based on an instruction operation code and a time sequence signal, to complete control of instruction reading and instruction execution.

The memory may be further disposed in the processor 210 and is configured to store an instruction and data. In some embodiments, the memory in the processor 210 is a cache memory. The memory may store an instruction or data that is just used or cyclically used by the processor 210. If the processor 210 needs to use the instruction or the data again, the processor 210 may directly invoke the instruction or the data from the memory, to avoid repeated access and reduce a waiting time of the processor 210. Therefore, system efficiency is improved.

In some embodiments, the processor 210 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identification module SIM interface, a universal serial bus (universal serial bus, USB) interface, and/or the like.

The I2C interface is a two-way synchronization serial bus and includes a serial data line (SDA) and a serial clock line (SCL). In some embodiments, the processor 210 may include a plurality of groups of I2C buses. The processor 210 may be separately coupled to the touch sensor 280K, a charger, a flash, the camera 293, and the like by using different I2C bus interfaces. For example, the processor 210 may be coupled to the touch sensor 280K by using the I2C interface, so that the processor 210 communicates with the touch sensor 280K by using the I2C bus interface, to implement a touch function of the electronic device 101.

The I2S interface may be used for audio communication. In some embodiments, the processor 210 may include a plurality of groups of I2S buses. The processor 210 may be coupled to the audio module 270 by using the I2S bus, to implement communication between the processor 210 and the audio module 270. In some embodiments, the audio module 270 may transfer an audio signal to the wireless communications module 260 by using the I2S interface, to implement a function of answering a call by using a Bluetooth headset.

The PCM interface may also be used for audio communication, and samples, quantizes, and codes an analog signal. In some embodiments, the audio module 270 may be coupled to the wireless communications module 260 through the PCM bus interface. In some embodiments, the audio module 270 may alternatively transfer an audio signal to the wireless communications module 260 by using the PCM interface, to implement a function of answering a call by using a Bluetooth headset. Both the I2S interface and the PCM interface may be used for audio communication.

The UART interface is a universal serial data bus and is used for asynchronous communication. The bus may be a two-way communications bus. The bus performs a conversion between serial communication and parallel communication on to-be-transmitted data. In some embodiments, the UART interface is usually configured to connect the processor 210 and the wireless communications module 260. For example, the processor 210 communicates with a Bluetooth module in the wireless communications module 260 through the UART interface, to implement a Bluetooth function. In some embodiments, the audio module 270 may transfer an audio signal to the wireless communications module 260 through the UART interface, to implement a function of playing music by using a Bluetooth headset.

The MIPI may be configured to connect the processor 210 and a peripheral component such as the display 294 or the camera 293. The MIPI includes a camera serial interface (CSI), a display serial interface (DSI), and the like. In some embodiments, the processor 210 communicates with the camera 293 through the CSI, to implement a photographing function of the electronic device 101. The processor 210 communicates with the display 294 through the DSI, to implement a display function of the electronic device 101.

The GPIO interface may be configured by using software. The GPIO interface may be configured as a control signal or may be configured as a data signal. In some embodiments, the GPIO interface may be configured to connect the processor 210 and the camera 293, the display 294, the wireless communications module 260, the audio module 270, the sensor module 280, or the like. The GPIO interface may alternatively be configured as the I2C interface, the I2S interface, the UART interface, the MIPI, or the like.

The USB interface 230 is an interface that conforms to a USB standard specification, and may be a mini USB interface, a micro USB interface, a USB Type-C interface, or the like. The USB interface 230 may be configured to be connected to the charger to charge the electronic device 101, or may be configured to perform data transmission between the electronic device 101 and a peripheral device, or may be configured to be connected to a headset, to play audio by using the headset. The interface may alternatively be configured to be connected to another electronic device such as an AR device.

It may be understood that an interface connection relationship between the modules illustrated in this embodiment is merely an example and does not constitute a limitation on a structure of the electronic device 101. In some other embodiments, the electronic device 101 may alternatively use an interface connection manner different from that in the foregoing embodiment, or use a combination of a plurality of interface connection manners.

The charging management module 240 is configured to receive charging input from the charger. The charger may be a wireless charger or a wired charger. In some embodiments of wired charging, the charging management module 240 may receive charging input from the wired charger by using the USB interface 230. In some embodiments of wireless charging, the charging management module 240 may receive wireless charging input by using a wireless charging coil of the electronic device 101.

For example, in this embodiment, the charging management module 240 of the electronic device 101 in FIG. 1A may receive wireless charging input by using the wireless charging coil of the electronic device 101, to wirelessly charge the electronic device 101.

It may be understood that when charging the battery 242, the charging management module 240 may further supply power to another component such as a processor or a screen of the electronic device 101 by using the power management module 241.

The power management module 241 is configured to connect the battery 242, the charging management module 240, and the processor 210. The power management module 241 receives input from the battery 242 and/or the charging management module 240, and supplies power to the processor 210, the internal memory 221, an external memory, the display 294, the camera 293, the wireless communications module 260, and the like. The power management module 241 may be further configured to monitor parameters such as a battery capacity, a battery cycle count, and a battery health status (an electric leakage or impedance). In some other embodiments, the power management module 241 may alternatively be disposed in the processor 210. In some other embodiments, the power management module 241 and the charging management module 240 may alternatively be disposed in a same device.

A wireless communication function of the electronic device 101 may be implemented by using the antenna 1, the antenna 2, the mobile communications module 250, the wireless communications module 260, the modem processor, the baseband processor, and the like.

The antenna 1 and the antenna 2 are configured to: transmit and receive an electromagnetic wave signal. Each antenna in the electronic device 101 may be configured to cover a single communications frequency band or a plurality of communications frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 250 may provide a wireless communication solution that includes 2G/3G/4G/5G or the like and that is applied to the electronic device 101. The mobile communications module 250 may include at least one filter, a switch, a power amplifier, a low noise amplifier (LNA), and the like. The mobile communications module 250 may receive an electromagnetic wave by using the antenna 1, perform processing such as filtering or amplification on the received electromagnetic wave, and transfer the electromagnetic wave to the modem processor for demodulation. The mobile communications module 250 may further amplify a signal modulated by the modem processor and convert the signal into an electromagnetic wave for radiation by using the antenna 1. In some embodiments, at least some function modules in the mobile communications module 250 may be disposed in the processor 210. In some embodiments, at least some function modules in the mobile communications module 250 may be disposed in a same device as at least some modules in the processor 210.

The modem processor may include a modulator and a demodulator. The modulator is configured to modulate a to-be-sent low frequency baseband signal into a medium-high frequency signal. The demodulator is configured to demodulate a received electromagnetic wave signal into a low frequency baseband signal. Then, the demodulator transfers the low frequency baseband signal obtained through demodulation to the baseband processor for processing. The low frequency baseband signal is processed by the baseband processor and is then transferred to the application processor. The application processor outputs a sound signal by using an audio device (not limited to the speaker 270A, the receiver 270B, or the like), or displays an image or a video by using the display 294. In some embodiments, the modem processor may be an independent device. In some other embodiments, the modem processor may be independent of the processor 210 and is disposed in a same device as the mobile communications module 250 or another function module.

The wireless communications module 260 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the electronic device 101. The wireless communications module 260 may be one or more devices integrating at least one communications processing module. The wireless communications module 260 receives an electromagnetic wave by using the antenna 2, performs frequency modulation and filtering processing on an electromagnetic wave signal, and sends a processed signal to the processor 210. The wireless communications module 260 may further receive a to-be-sent signal from the processor 210, perform frequency modulation and amplification on the signal, and convert the signal into an electromagnetic wave for radiation by using the antenna 2.

In some embodiments, the antenna 1 and the mobile communications module 250 in the electronic device 101 are coupled, and the antenna 2 and the wireless communications module 260 in the electronic device 101 are coupled, so that the electronic device 101 can communicate with a network and another device by using a wireless communications technology. The wireless communications technology may include a global system for mobile communications (GSM), a general packet radio service (GPRS), code division multiple access ( ), wideband code division multiple access (WCDMA), time-division code division multiple access (-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (quasi-zenith satellite system, QZSS)), and/or a satellite based augmentation system (satellite based augmentation systems, SBAS).

The electronic device 101 implements a display function by using the GPU, the display 294, the application processor, and the like. The GPU is a microprocessor for image processing and is connected to the display 294 and the application processor. The GPU is configured to perform mathematical and geometric calculation and is configured to render an image. The processor 210 may include one or more GPUs that execute a program instruction to generate or change display information.

The display 294 is configured to display an image, a video, and the like. The display 294 includes a display panel. The display panel may use a liquid crystal display (LCD), an organic light-emitting diode (OLED), an active-matrix organic light-emitting diode or an active-matrix organic light-emitting diode (AMOLED), a flexible light-emitting diode (FLED), a Mini-LED, a Micro-LED, a Micro-OLED, a quantum dot light-emitting diode (QLED), or the like. In some embodiments, the electronic device 101 may include one or N displays 294, where N is a positive integer greater than 1.

The electronic device 101 may implement a photographing function by using the ISP, the camera 293, the video codec, the GPU, the display 294, the application processor, and the like.

The ISP is configured to process data fed back by the camera 293. For example, during photographing, a shutter is opened, a ray of light is transmitted to a light-sensitive element of the camera through a lens, an optical signal is converted into an electrical signal, the light-sensitive element of the camera transmits the electrical signal to the ISP for processing, and the electrical signal is converted into an image that can be seen. The ISP may further optimize an algorithm for noise, brightness, and complexion of an image. The ISP may further optimize parameters such as exposure and a color temperature of a photographing scenario. In some embodiments, the ISP may be disposed in the camera 293.

The camera 293 is configured to capture a static image or a video. An optical image of an object is generated by using a lens and is projected to a light-sensitive element. The light-sensitive element may be a charge coupled device (CCD) or a complementary metal-oxide-semiconductor (CMOS) photoelectric transistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in a format such as RGB or YUV. In some embodiments, the electronic device 101 may include one or N cameras 293, where N is a positive integer greater than 1.

The digital signal processor is configured to process a digital signal. In addition to a digital image signal, the digital signal processor may further process another digital signal. For example, when the electronic device 101 selects a frequency, the digital signal processor is configured to perform Fourier transform on frequency energy, or the like.

The video codec is configured to compress or decompress a digital video. The electronic device 101 may support one or more video codecs. In this way, the electronic device 101 can play or record videos in a plurality of coding formats, for example, moving picture experts group (MPEG) MPEG-1, MPEG-2, MPEG-3, and MPEG-4.

The NPU is a neural-network computing processor that processes input information rapidly by referring to a structure of a biological neural network, for example, by referring to a transfer mode between human brain neurons, and can further perform self-learning continuously. The NPU can implement applications such as intelligent cognition of the electronic device 101, such as image recognition, facial recognition, speech recognition, and text understanding.

The external memory interface 220 may be configured to be connected to an external storage card such as a micro SD card, to extend a storage capability of the electronic device 101. The external storage card communicates with the processor 210 by using the external memory interface 220, to implement a data storage function, for example, store files such as music and a video in the external storage card.

The internal memory 221 may be configured to store computer executable program code, and the computer executable program code includes an instruction. The processor 210 performs various function applications of the electronic device 101 and data processing by running the instruction stored in the internal memory 221. The internal memory 221 may include a program storage area and a data storage area. The program storage region may store an operating system, an application program required by at least one function (for example, a sound playing function or an image playing function), and the like. The data storage area may store data (for example, audio data or an address book) created during use of the electronic device 101, and the like. In addition, the internal memory 221 may include a high-speed random access memory, and may further include a nonvolatile memory, for example, at least one magnetic disk storage device, a flash memory device, or a universal flash storage (universal flash storage, UFS).

The electronic device 101 may implement an audio function such as music playing or recording by using the audio module 270, the speaker 270A, the receiver 270B, the microphone 270C, the headset jack 270D, the application processor, and the like.

The audio module 270 is configured to convert digital audio information into an analog audio signal for output and is also configured to convert analog audio input into a digital audio signal. The audio module 270 may be further configured to: code and decode an audio signal. In some embodiments, the audio module 270 may be disposed in the processor 210, or some function modules in the audio module 270 are disposed in the processor 210.

The speaker 270A, also referred to as a "speaker", is configured to convert an audio electrical signal into a sound signal. The electronic device 101 may listen to music or answer a hands-free call by using the speaker 270A.

The receiver 270B, also referred to as a "receiver", is configured to convert an audio electrical signal into a sound signal. When the electronic device 101 answers a call or receives voice information, the receiver 270B may be placed close to a human ear to listen to a voice.

The microphone 270C, also referred to as a "microphone", is configured to convert a sound signal into an electrical signal. When making a call or sending voice information, a user may make a sound by moving a human mouth close to the microphone 270C to input a sound signal to the microphone 270C. At least one microphone 270C may be disposed in the electronic device 101. In some other embodiments, two microphones 270C may be disposed in the electronic device 101, to collect a sound signal and further implement a noise reduction function. In some other embodiments, three, four, or more microphones 270C may alternatively be disposed in the electronic device 101, to collect a sound signal, reduce noise, identify a sound source, implement a directional recording function, and the like.

The headset jack 270D is configured to be connected to a wired headset. The headset jack 270D may be the USB interface 230, or may be a 3.5 mm open mobile electronic device platform (OMTP) standard interface or a cellular telecommunications industry association of the USA ( ) standard interface.

The pressure sensor 280A is configured to sense a pressure signal and can convert the pressure signal into an electrical signal. In some embodiments, the pressure sensor 280A may be disposed on the display 294. There are many types of pressure sensors 280A such as a resistive pressure sensor, an inductive pressure sensor, and a capacitive pressure sensor. The capacitive pressure sensor may be a parallel plate including at least two conductive materials. Capacitance between electrodes changes when a force is performed on the pressure sensor 280A. The electronic device 101 determines an intensity of pressure based on the change in the capacitance. When a touch operation is performed on the display 294, the electronic device 101 detects an intensity of the touch operation based on the pressure sensor 280A. The electronic device 101 may also calculate a touch position based on a detection signal of the pressure sensor 280A. In some embodiments, touch operations that are applied to a same touch position but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to a first pressure threshold is performed on an SMS message application icon, an instruction for creating an SMS message is executed.

The gyro sensor 280B may be configured to determine a motion posture of the electronic device 101. In some embodiments, an angular velocity of the electronic device 101 around three axes (namely, x, y, and z axes) may be determined by using the gyro sensor 280B. The gyro sensor 280B may be used for image stabilization during photographing. For example, when the shutter is opened, the gyro sensor 280B detects an angle at which the electronic device 101 jitters, obtains, through calculation based on the angle, a distance for which a lens module needs to compensate, and allows the lens to cancel the jitter of the electronic device 101 through reverse motion, to implement image stabilization. The gyro sensor 280B may also be used in navigation and somatic game scenarios.

The barometric pressure sensor 280C is configured to measure atmospheric pressure. In some embodiments, the electronic device 101 calculates an altitude by using a value of the atmospheric pressure measured by the barometric pressure sensor 280C, to assist positioning and navigation.

The magnetic sensor 280D includes a Hall sensor. The electronic device 101 may detect opening and closing of a flip leather case by using the magnetic sensor 280D. In some embodiments, when the electronic device 101 is a clamshell phone, the electronic device 101 may detect opening and closing of a flip cover based on the magnetic sensor 280D. Further, a feature such as automatic unlocking of the flip cover is set based on a detected opening or closing state of the leather case or a detected opening or closing state of the flip cover.

The acceleration sensor 280E may detect magnitude of accelerations of the electronic device 101 in all directions (usually on three axes), may detect magnitude and a direction of gravity when the electronic device 101 is static, and may be further configured to recognize a posture of the electronic device, and applied to an application such as switching between landscape mode and portrait mode or a pedometer.

The range sensor 280F is configured to measure a distance. The electronic device 101 may measure the distance through infrared or a laser. In some embodiments, in a photographing scenario, the electronic device 101 may perform ranging by using the range sensor 280F to implement fast focusing.

For example, the optical proximity sensor 280G may include a light-emitting diode (LED) and an optical detector, for example, a photodiode. The light-emitting diode may be an infrared light-emitting diode. The electronic device 101 emits infrared light by using the light-emitting diode. The electronic device 101 detects infrared reflected light from a nearby object by using the photodiode. When detecting sufficient reflected light, the electronic device 101 may determine that there is an object near the electronic device 101. When detecting insufficient reflected light, the electronic device 101 may determine that there is no object near the electronic device 101. The electronic device 101 may detect, by using the optical proximity sensor 280G, that the user holds the electronic device 101 close to an ear to make a call, to automatically turn off a screen for power saving. The optical proximity sensor 280G may also be used in a leather case mode or a pocket mode to automatically unlock or lock the screen.

The ambient light sensor 280L is configured to sense ambient light luminance. The electronic device 101 may adaptively adjust luminance of the display 294 based on the sensed ambient light luminance. The ambient light sensor 280L may also be configured to automatically adjust a white balance during photographing. The ambient light sensor 280L may also cooperate with the optical proximity sensor 280G to detect whether the electronic device 101 is in a pocket to prevent an accidental touch.

The fingerprint sensor 280H is configured to collect a fingerprint. The electronic device 101 may use a feature of the collected fingerprint to implement fingerprint-based unlocking, application lock accessing, fingerprint-based photographing, fingerprint-based call answering, and the like.

The temperature sensor 280J is configured to detect a temperature. In some embodiments, the electronic device 101 executes a temperature processing policy by using the temperature detected by the temperature sensor 280J. For example, when the temperature reported by the temperature sensor 280J exceeds a threshold, the electronic device 101 lowers performance of a processor located near the temperature sensor 280J, to reduce power consumption to implement thermal protection. In some other embodiments, when the temperature is less than another threshold, the electronic device 101 heats the battery 242, to avoid a case in which the electronic device 101 is shut down abnormally due to a low temperature. In some other embodiments, when the temperature is less than still another threshold, the electronic device 101 boosts an output voltage of the battery 242, to avoid an abnormal shutdown caused by a low temperature.

The touch sensor 280K is also referred to as a "touch panel". The touch sensor 280K may be disposed on the display 294. The touch sensor 280K and the display 294 form a touchscreen, which is also referred to as a "touchscreen". The touch sensor 280K is configured to detect a touch operation performed on or near the touch sensor 280K.

The touch sensor may transfer the detected touch operation to the application processor to determine a type of a touch event. Visual output related to the touch operation may be provided by using the display 294. In some other embodiments, the touch sensor 280K may also be disposed on a surface of the electronic device 101 at a location different from that of the display 294.

The bone conduction sensor 280M may obtain a vibration signal. In some embodiments, the bone conduction sensor 280M may obtain a vibration signal of a vibration bone of a human vocal part. The bone conduction sensor 280M may also contact a body pulse to receive a blood pressure beating signal. In some embodiments, the bone conduction sensor 280M may also be disposed in the headset, to combine into a bone conduction headset. The audio module 270 may obtain a voice signal through parsing based on the vibration signal that is of the vibration bone of the vocal part and that is obtained by the bone conduction sensor 280M, to implement a voice function. The application processor may parse heart rate information based on the blood pressure beating signal obtained by the bone conduction sensor 280M, to implement a heart rate detection function.

The key 290 includes a power key, a volume key, and the like. The key 290 may be a mechanical key or may be a touch key. The electronic device 101 may receive key input, generate key signal input related to a user setting and function control of the electronic device 101.

The motor 291 may generate a vibration prompt. The motor 291 may be used for an incoming call vibration prompt or may be used for a touch vibration feedback. For example, touch operations performed on different applications (for example, photographing and audio playing) may correspond to different vibration feedback effects. The motor 291 may also correspond to different vibration feedback effects for touch operations performed on different areas of the display 294. Different application scenarios (for example, a time reminder, information receiving, an alarm clock, and a game) may also correspond to different vibration feedback effects. Customization of the touch vibration feedback effect may be further supported.

The indicator 292 may be an indicator light that may be configured to indicate a charging status and a power change, or may be configured to indicate a message, a missed call, a notification, and the like.

The SIM card interface 295 is configured to be connected to a SIM card. The SIM card may be inserted into the SIM card interface 295 or plugged from the SIM card interface 295, to come into contact with or be separated from the electronic device 101. The electronic device 101 may support one or N SIM card interfaces, where N is a positive integer greater than 1. The SIM card interface 295 may support a nano-SIM card, a micro-SIM card, a SIM card, and the like. A plurality of cards may be simultaneously inserted into a same SIM card interface 295. The plurality of cards may be of a same type or different types. The SIM card interface 295 may also be compatible with different types of SIM cards. The SIM card interface 295 may also be compatible with the external storage card. The electronic device 101 interacts with a network by using the SIM card, to implement a call function, a data communication function, and the like. In some embodiments, the electronic device 101 uses an eSIM, namely, an embedded SIM card. The eSIM card may be embedded in the electronic device 101 and cannot be separated from the electronic device 101.

A software system of the electronic device 101 may use a layered architecture, an event-driven architecture, a micro-kernel architecture, a micro service architecture, or a cloud architecture. In this embodiment, an Android system with a layered architecture is used as an example to describe a software structure of the electronic device 101.

Figure 2B:
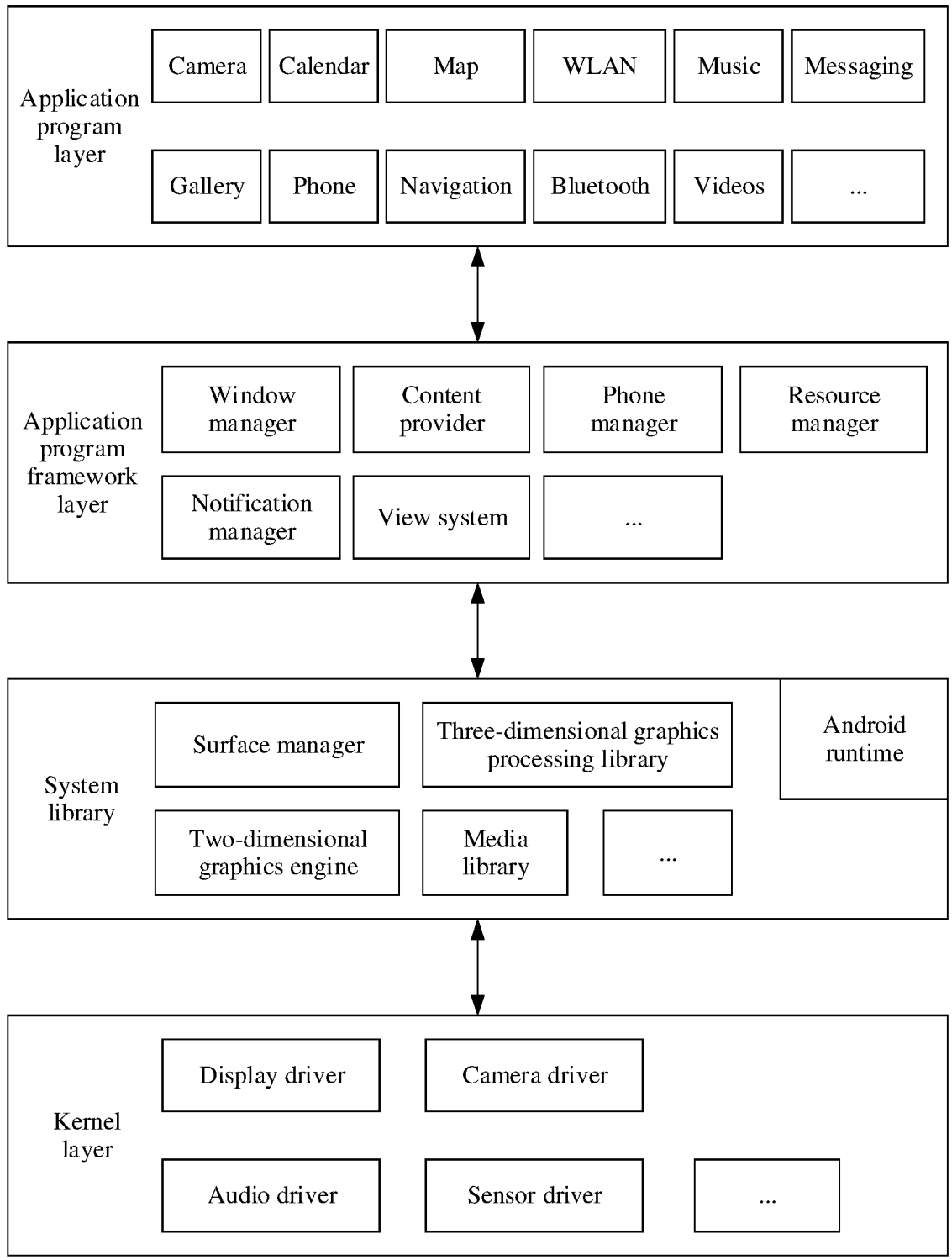
FIG. 2B is a schematic diagram of a software structure of an electronic device according to an embodiment.

FIG. 2B is a schematic diagram of a software structure of an electronic device 101 according to an embodiment.

In a layered architecture, software is divided into several layers, and each layer has a clear role and task. The layers communicate with each other by using a software interface. In some embodiments, the Android system is divided into four layers, namely, an application program layer, an application program framework layer, an Android runtime and a system library, and a kernel layer from top to bottom.

The application program layer may include a series of application program packages.

As shown in FIG. 2B, the application program package may include application programs such as Camera, Gallery, Calendar, Phone, Map, Navigation, WLAN, Bluetooth, Music, Videos, and Messaging.

The application program framework layer provides an application programming interface (API) and a programming framework for an application program at the application program layer. The application program framework layer includes some predefined functions.

As shown in FIG. 2B, the application program framework layer may include a window manager, a content provider, a view system, a phone manager, a resource manager, a notification manager, and the like.

The window manager is configured to manage a window program. The window manager may obtain a size of a display, determine whether there is a status bar, lock a screen, take a screenshot, and the like.

The content provider is configured to: store and obtain data and make the data accessible to the application program. The data may include a video, an image, an audio, calls that are made and answered, a browsing history and a bookmark, an address book, and the like.

The view system includes visual controls such as a control for displaying a text and a control for display a picture. The view system may be configured to construct an application program. The display interface may include one or more views. For example, a display interface including an SMS message notification icon may include a view for displaying a text and a view for displaying a picture.

The phone manager is configured to provide a communication function of the electronic device 101, for example, management of a call status (including answering or declining).

The resource manager provides various resources such as a localized character string, an icon, a picture, a layout file, and a video file for an application program.

The notification manager enables an application program to display notification information in a status bar and may be configured to convey a notification-type message. The notification-type message may automatically disappear after a short pause without user interaction. For example, the notification manager is configured to provide notifications of download completing, a message prompt, and the like. The notification manager may be a notification that appears on a top status bar of the system in a form of a graph or a scroll bar text, for example, a notification of an application program running on the background, or may be a notification that appears on the screen in a form of a dialog window. For example, text information is prompted with in the status bar, an announcement is produced, the electronic device vibrates, or the indicator light blinks.

The Android runtime includes a kernel library and a virtual machine. The Android runtime is responsible for scheduling and management of the Android system.

The kernel library includes two parts: a function that needs to be called by a java language and a kernel library of Android.

The application program layer and the application program framework layer run on the virtual machine. The virtual machine executes java files of the application program layer and the application program framework layer as binary files. The virtual machine is configured to perform functions such as object lifecycle management, stack management, thread management, security and exception management, and garbage collection.

The system library may include a plurality of function modules, for example, a surface manager, a media library, a three-dimensional graphics processing library (for example, OpenGL ES), and a 2D graphics engine (for example, SGL).

The surface manager is configured to: manage a display subsystem and provide fusion of 2D and 3D layers for a plurality of application programs.

The media library supports playback and recording in a plurality of commonly used audio and video formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes a working process of software and hardware of the electronic device 101 by using an example with reference to a photographing capture scenario.

When the touch sensor 280K receives a touch operation, a corresponding hardware interrupt is sent to the kernel layer. The kernel layer processes the touch operation into a raw input event (including information such as touch coordinates or a time stamp of the touch operation). The raw input event is stored at the kernel layer. The application program framework layer obtains the raw input event from the kernel layer, and identifies a control corresponding to the input event. For example, the touch operation is a touch tap operation, and a control corresponding to the tap operation is a control of a camera application icon. A camera application invokes an interface at the application program framework layer to enable the camera application, then enables a camera driver by invoking the kernel layer and captures a static image or a video by using the camera 293.

The following describes, with reference to the accompanying drawings, a wireless charging method and an electronic device that are provided in some embodiments.

Figure 3:
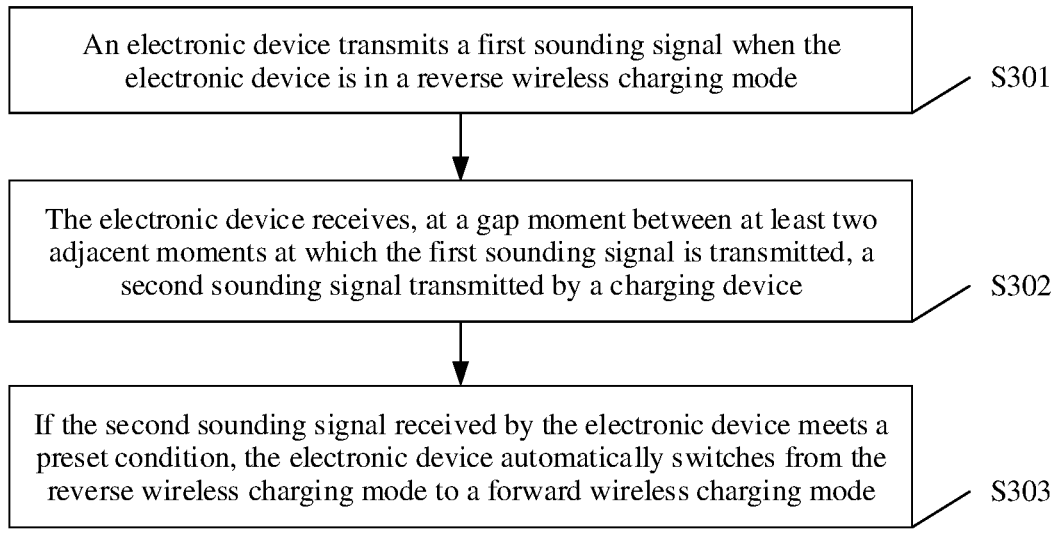
FIG. 3 is a schematic flowchart of a wireless charging method according to an embodiment.

FIG. 3 is a schematic flowchart of a wireless charging method according to an embodiment. As shown in FIG. 3, the wireless charging method includes steps S301 to S303.

S301: An electronic device transmits a first detecting signal when the electronic device is in a reverse wireless charging mode.

The electronic device is the first electronic device 101 shown in FIG. 1A and FIG. 1B.

In actual application, the electronic device includes a wireless charging circuit with a wireless charging coil. As shown in FIG. 2A, the wireless charging circuit may include a charging management module 240, a power management module 241, and a wireless charger. The wireless charger usually includes a wireless charging coil, to transmit a first detecting signal and receive a response signal for the first detecting signal. That the wireless charging circuit works in a reverse wireless charging mode means that the electronic device is attempting to wirelessly charge another electronic device.

The first detecting signal is used by the electronic device in the reverse wireless charging mode, for example, the electronic device 101 in FIG. 1B, to detect whether another electronic device such as the smartwatch in FIG. 1B meets a wireless charging condition. When a strength of the first detecting signal received by the smartwatch is greater than a preset strength threshold, the smartwatch transmits a first response signal for the first detecting signal. After receiving the first response signal, the electronic device stops transmitting the first detecting signal, and transmits a charging signal to the smartwatch, to wirelessly charge the smartwatch.

It should be noted that to save power, a transmit power of a detecting signal transmitted by a power supply party is usually less than a transmit power of a charging signal transmitted by the power supply party, and a transmit frequency of the detecting signal transmitted by the power supply party is usually less than a transmit frequency of the charging signal transmitted by the power supply party.

It is understood that the electronic device wirelessly charges the another electronic device such as the smartwatch only when the electronic device is in the reverse wireless charging mode, for example, the electronic device is manually set to the reverse wireless charging mode.

Certainly, the electronic device does not always transmit the first detecting signal, to avoid a power waste. For example, the Qi standard specifies that a wireless charging device sends a detecting signal every 500 milliseconds (ms). Duration for sending the detecting signal each time is usually 90 ms.

For example, the electronic device may control, by using a processor of the electronic device, a charging apparatus of the electronic device to transmit the first detecting signal.

S302: The electronic device receives, at a gap moment between at least two adjacent moments at which the first detecting signal is transmitted, a second detecting signal transmitted by the wireless charging device.

For example, a transmit frequency of the first detecting signal is a first transmit frequency, and a transmit frequency of the second detecting signal is a second transmit frequency.

The second detecting signal is used by the wireless charging device to detect whether the electronic device such as the electronic device 101 in FIG. 1A meets a wireless charging condition.

In a possible method, the first transmit frequency is different from the second transmit frequency, and the first transmit frequency is not an integer multiple of the second transmit frequency. The electronic device receives, at a gap moment between two adjacent moments at which the first detecting signal is transmitted, the second detecting signal transmitted by the wireless charging device.

Figure 4:
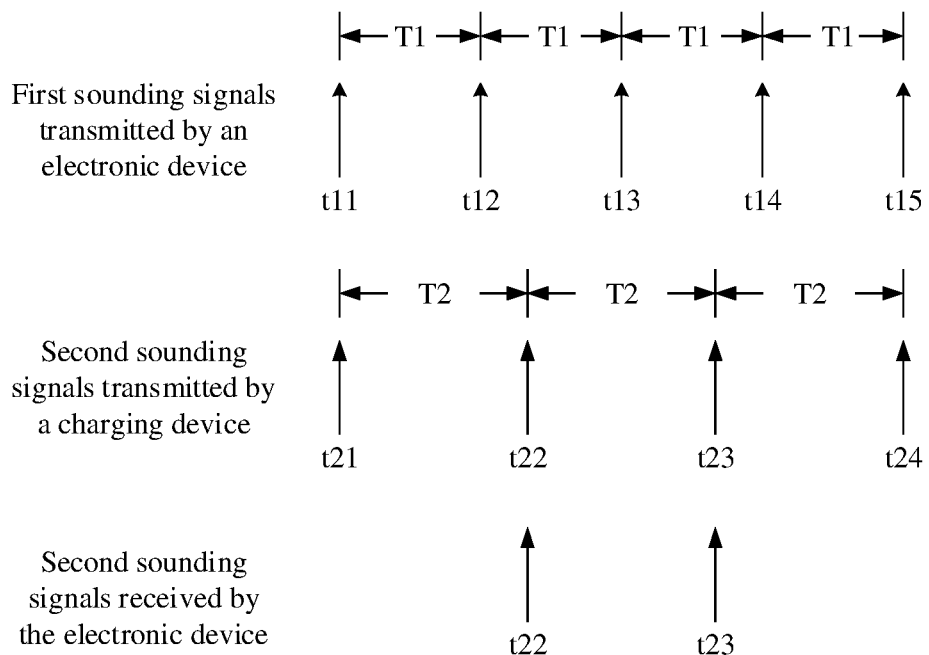
FIG. 4 is a schematic diagram of a time sequence relationship between a second detecting signal transmitted by a wireless charging device and a first detecting signal transmitted by an electronic device according to an embodiment.

FIG. 4 is a schematic diagram of a time sequence relationship between a second detecting signal transmitted by a wireless charging device and a first detecting signal transmitted by an electronic device according to an embodiment.

As shown in FIG. 4, the electronic device sequentially transmits first detecting signals at moments t11 to t15, where a transmit frequency is f1, and a corresponding first transmission cycle is T1. The wireless charging device transmits second detecting signals at t21 to t24, where a transmit frequency is f2, a corresponding first transmission cycle is T2, and T2 is greater than T1, that is, f1 is less than f2. As shown in FIG. 4, at the moments t22 and t23, a charging apparatus of the electronic device transmits no first detecting signal, that is, the charging apparatus of the electronic device is in an idle state, and in this case, the electronic device may receive, by using the charging apparatus of the electronic device, the second detecting signals transmitted by the wireless charging device.

Referring to FIG. 4, t12 and t13 are two adjacent moments at which the electronic device transmits the first detecting signal. The electronic device receives, at a gap moment t22 between t12 and t13, the second detecting signal t22 transmitted by the wireless charging device.

For example, a circuit or an apparatus used by the electronic device to receive the second detecting signal may be a wireless charging circuit of the electronic device, or may be a circuit, a device, or an apparatus coupled to a wireless charging circuit of the electronic device.

Figure 5:
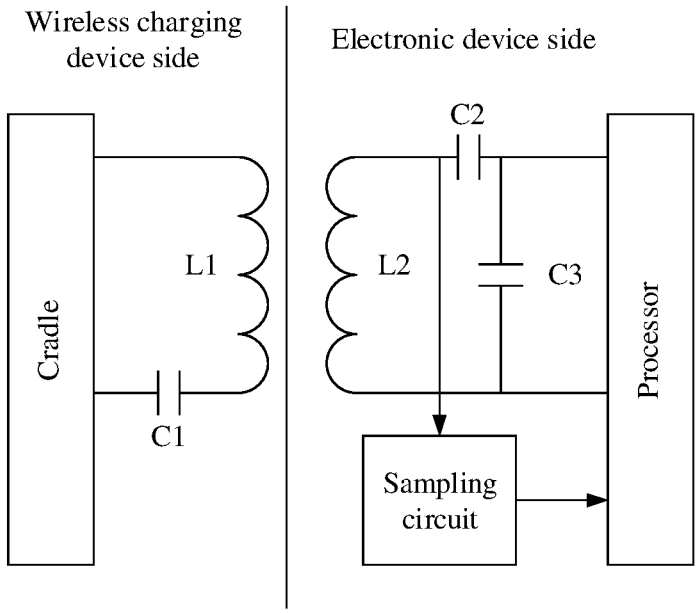
FIG. 5 is a schematic structural diagram of a wireless charging circuit according to an embodiment.

For example, as shown in FIG. 5, a wireless charging circuit of the wireless charging device includes a transmitting coil L1 and a capacitor C1, and a wireless charging circuit of the electronic device includes a receiving coil L2 and capacitors C2 and C3. The wireless charging circuit that receives the second detecting signal may be a sampling circuit coupled to the wireless charging circuit of the electronic device, for example, a sampling circuit in FIG. 5.

It may be understood that a circuit or an apparatus used by the electronic device to receive the second detecting signal may alternatively be another circuit, device, and apparatus independent of the foregoing wireless charging circuit, for example, an electromagnetic sensor (for example, a Hall sensor) in the electronic device. This is not limited in this embodiment.

After receiving the second detecting signal by using the sampling circuit or the electromagnetic sensor, the electronic device determines, by using the processor of the electronic device, whether the received second detecting signal meets a preset condition.

For example, the electronic device may determine whether a strength of the second detecting signal received by the electronic device is greater than a preset strength threshold. In a possible method, the preset condition may include at least one of the following:

a voltage of the second detecting signal is greater than a first voltage threshold;
a current of the second detecting signal is greater than a first current threshold; or
a power of the second detecting signal is greater than a first power threshold.

It should be noted that the first voltage threshold, the first current threshold, and the first power threshold may be preset based on an actual requirement for wireless charging.

To improve accuracy of a result of determining the preset condition and avoid misdetermining, a smallest quantity of times that the preset condition is met may also be limited. Therefore, in another possible method, the preset condition may alternatively include at least one of the following:

a quantity of times that a voltage of the second detecting signal received by the electronic device in a preset time is greater than a first voltage threshold is greater than a first time quantity threshold;
a quantity of times that a current of the second detecting signal received by the electronic device in a preset time is greater than a first current threshold is greater than a second time quantity threshold; or a quantity of times that a power of the second detecting signal received by the electronic device in a preset time is greater than a first power threshold is greater than a third time quantity threshold.

It should be noted that the preset time, the first time quantity threshold, the second time quantity threshold, and the third time quantity threshold may be preset based on an actual requirement for wireless charging, for example, a battery capacity or a charging power.

S303: If the second detecting signal received by the electronic device meets the preset condition, the electronic device automatically switches from the reverse wireless charging mode to a forward wireless charging mode.

That the electronic device automatically switches from the reverse wireless charging mode to the forward wireless charging mode means that the electronic device is ready to receive a charging signal transmitted by the wireless charging device.

If the second detecting signal received by the electronic device meets the preset condition, the wireless charging method may further include step 1 and step 2.

Step 1: The electronic device transmits a response signal to the wireless charging device.

The response signal carries indication information. The indication information may be used to indicate that the second detecting signal received by the electronic device meets the preset condition. The indication information may alternatively be used to indicate that the electronic device is ready to receive the charging signal from the wireless charging device. The indication information may alternatively be used to instruct the wireless charging device to output the charging signal.

After the wireless charging device receives the response signal transmitted by the electronic device, the wireless charging device may transmit the charging signal to the electronic device. In other words, the wireless charging method may further include the following step:

Step 2: The electronic device receives the charging signal transmitted by the wireless charging device.

It should be noted that to reduce a waste of excessive electric energy in a process of transmitting the second detecting signal and improve charging efficiency in a charging process, at least one of the following conditions usually needs to be met when the wireless charging device transmits the second detecting signal and the charging signal.

Condition 1: A transmit frequency of the second detecting signal is less than a transmit frequency of the charging signal.

Condition 2: A transmit power of the second detecting signal is less than a transmit power of the charging signal.

Condition 3: The wireless charging device may intermittently transmit the second detecting signal, for example, transmit the second detecting signal every 500 milliseconds for 10 milliseconds. After receiving the response signal transmitted by the electronic device, the wireless charging device may continuously transmit the charging signal until charging of the electronic device is completed.

It should be noted that to avoid a case in which electric energy is wasted because the electronic device transmits the first detecting signal, when the electronic device is in the forward wireless charging mode, the electronic device may not transmit the first detecting signal.

According to the wireless charging method provided in this embodiment, the electronic device is in the reverse wireless charging mode and transmits the first detecting signal. The electronic device may receive, at the gap moment between the moments at which the electronic device transmits the first detecting signal, the second detecting signal transmitted by the wireless charging device, and when the electronic device detects that the received second detecting signal meets the preset condition, the electronic device can automatically switch from the reverse wireless charging mode to the forward wireless charging mode, in other words, the electronic device can automatically and adaptively switch from the forward wireless charging mode to the reverse wireless charging mode without a manual operation, to improve wireless charging reliability and user experience.

The foregoing describes, in detail with reference to FIG. 3 to FIG. 5, the wireless charging method provided in the embodiments. The following describes in detail the electronic device in the foregoing method embodiments with reference to FIG. 6 and FIG. 7.

In some embodiments, the electronic device may be divided into function modules or function units based on the foregoing method examples. For example, the function modules or the function units may be obtained through division based on corresponding functions, or two or more functions may be integrated into one processing module. The foregoing integrated module may be implemented in a form of hardware or may be implemented in a form of a software function module or function unit. It should be noted that in the embodiments, division into the modules or units is an example and is merely logical function division and may be other division in an actual implementation.

Figure 6:
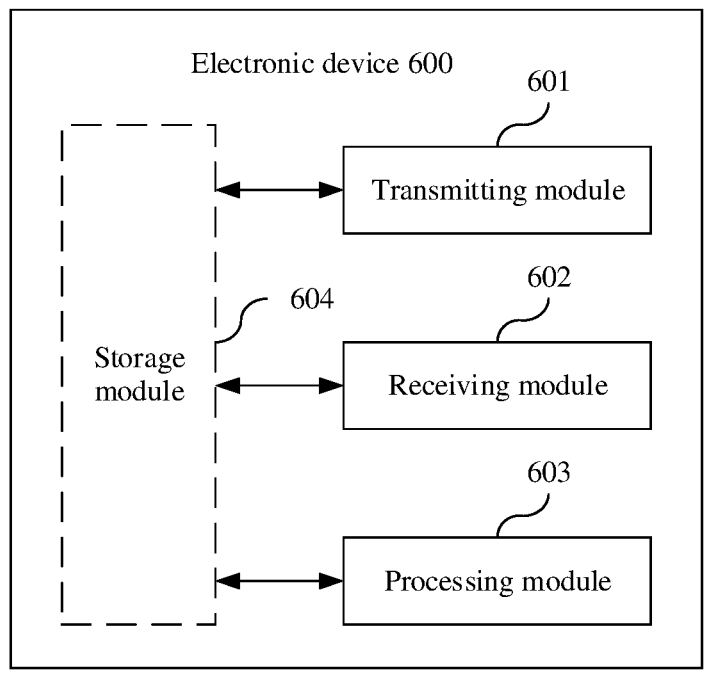
FIG. 6 is a schematic structural diagram 1 of an electronic device according to an embodiment.

FIG. 6 is a possible schematic structural diagram of the electronic device in the foregoing embodiments. As shown in FIG. 6, an electronic device 600 includes a transmitting module 601, a receiving module 602, and a processing module 603.

The transmitting module 601 is configured to transmit a first detecting signal when the electronic device is in a reverse wireless charging mode.

The receiving module 602 is configured to receive, at a gap moment between at least two adjacent moments at which the first detecting signal is transmitted, a second detecting signal transmitted by a wireless charging device.

The processing module 603 is configured to: if the second detecting signal received by the receiving module 602 meets a preset condition, automatically switch the electronic device from the reverse wireless charging mode to a forward wireless charging mode.

In addition, as shown in FIG. 6, the electronic device 600 may further include a storage module 604, configured to store a program instruction and data that are of the electronic device 600.

For example, a transmit frequency of the first detecting signal is a first transmit frequency, and a transmit frequency of the second detecting signal is a second transmit frequency. In a possible method, the first transmit frequency is different from the second transmit frequency, and the first transmit frequency is not an integer multiple of the second transmit frequency.

In a possible method, the preset condition includes at least one of the following:
a voltage of the second detecting signal received by the electronic device is greater than a first voltage threshold;
a current of the second detecting signal received by the electronic device is greater than a first current threshold; or
a power of the second detecting signal received by the electronic device is greater than a first power threshold.

In another possible method, the preset condition includes at least one of the following:
a quantity of times that a voltage of the second detecting signal received by the electronic device in a preset time is greater than a first voltage threshold is greater than a first time quantity threshold;
a quantity of times that a current of the second detecting signal received by the electronic device in a preset time is greater than a first current threshold is greater than a second time quantity threshold; or
a quantity of times that a power of the second detecting signal received by the electronic device in a preset time is greater than a first power threshold is greater than a third time quantity threshold.

In a possible method, the transmitting module 601 is further configured to transmit a response signal to the wireless charging device.

The response signal carries indication information, and the indication information is used to indicate that the second detecting signal received by the electronic device meets the preset condition.

Optionally, the receiving module 602 is further configured to: after the transmitting module 601 transmits the response signal to the wireless charging device, receive a charging signal transmitted by the wireless charging device.

Optionally, a transmit power of the charging signal is greater than a transmit power of the second detecting signal; and/or a transmit frequency of the charging signal is greater than the second transmit frequency.

In this embodiment, the receiving module 602 and the transmitting module 601 each may be a charging circuit including a charging coil or an apparatus in the electronic device.

Figure 7:
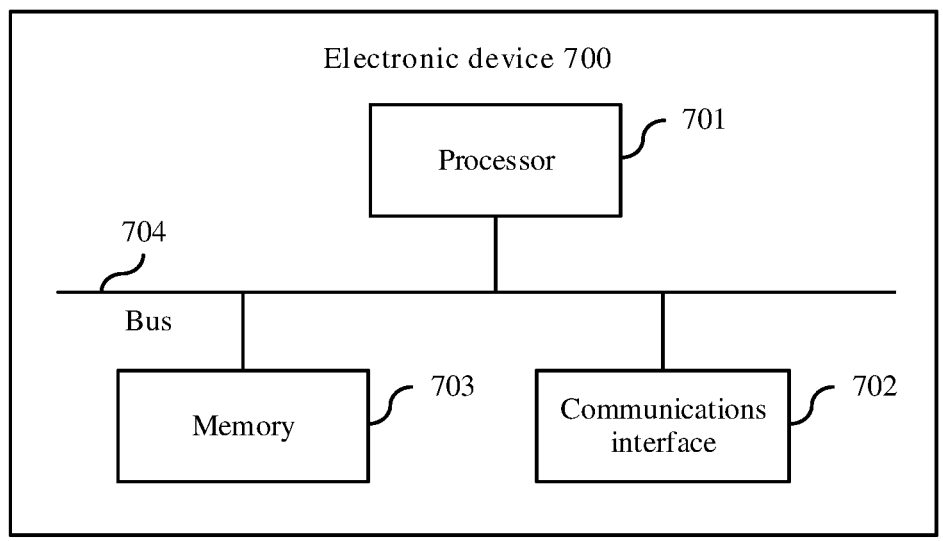
FIG. 7 is a schematic structural diagram 2 of an electronic device according to an embodiment.

FIG. 7 is another possible schematic structural diagram of the electronic device in the foregoing embodiments. As shown in FIG. 7, an electronic device 700 includes a processor 701 and a communications interface 702. The processor 701 is configured to: control and manage an action of the electronic device, for example, perform the step performed by the processing module 603. In addition, the processor 701 is further configured to control the communications interface 702 to support the electronic device in communicating with another network entity, for example, perform the steps performed by the transmitting module 601 and the receiving module 602. In addition, the electronic device may further include a memory 703 and a bus 704. The memory 703 is configured to store program code and data that are of the electronic device.

The processor 701 may be a processor or a controller in the electronic device. The processor or the controller may implement or execute various example logical blocks, modules, and circuits described with reference to the embodiments. The processor or the controller may be a central processing unit, a general purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content in the embodiments. Alternatively, the processor may be a combination of processors implementing a computing function, for example, a combination of one or more microprocessors, or a combination of a digital signal processor DSP and a microprocessor.

The communications interface 702 may be a transceiver, a transceiver circuit, a communications interface, or the like in the electronic device. In this embodiment, the communications interface 702 may be a charging circuit including a charging coil or an apparatus in the electronic device.

The memory 703 may be a memory or the like in the electronic device. The memory may include a volatile memory, for example, a random access memory. The memory may alternatively include a nonvolatile memory, for example, a read-only memory, a flash memory, a hard disk, or a solid-state drive. The memory may alternatively include a combination of the foregoing types of memories.

The bus 704 may be an extended industry standard structure (EISA) bus, or the like. The bus 704 may be classified into an address bus, a data bus, a control bus, and the like. For ease of representation, only one thick line is used to represent the bus 704 in FIG. 7, but this does not mean that there is only one bus or only one type of bus.

In addition, an embodiment further provides a computer readable storage medium. The computer readable storage medium stores a computer instruction. When the computer instruction is run on a computer, the computer is enabled to perform the wireless charging method provided in the embodiments and corresponding operations and/or procedures performed by the electronic device or the second device in the embodiments of the resource scheduling method.

An embodiment further provides a computer program product. The computer program product includes computer program code. When the computer program code is run on a computer, the computer is enabled to perform the resource scheduling method provided in the embodiments and corresponding operations and/or procedures performed by the electronic device or the second device in the embodiments of the resource scheduling method.

The embodiments further provide a chip system that can be applied to the foregoing electronic device. The chip system includes a processor and a communications interface. The processor is configured to: read and run a computer program stored in a memory, to perform the wireless charging method provided in the embodiments and corresponding operations and/or procedures performed by the electronic device in the embodiments of the wireless charging method. The memory is connected to the processor by using a circuit or an electric wire. The processor is configured to: read and execute the computer program in the memory. The communications interface is configured to receive data and/or information that need/needs to be processed. The processor obtains the data and/or information from the communications interface and processes the data and/or information. For example, the communications interface may be a transceiver or an input/output interface.

An embodiment provides a wireless charging system. The wireless charging system may include the foregoing electronic device and wireless charging device and is configured to perform the wireless charging method provided in the embodiments. For specific descriptions of the electronic device and the wireless charging device, refer to the foregoing method embodiments and apparatus embodiments. Details are not described herein again.

It should be understood that the processor in the embodiments may be a central processing unit (CPU). Alternatively, the processor may be another general purpose processor, a DSP, an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

It should be further understood that the memory in the embodiments may be a volatile memory or a nonvolatile memory or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. In an example but not limitative description, many forms of random access memories (RAM) may be used, for example, a static random access memory (SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by using software, hardware (for example, a circuit), firmware, or any combination thereof. When software is used to implement the embodiments, the foregoing embodiments may be implemented completely or partially in a form of a computer program product. The computer program product includes one or more computer instructions or computer programs. When the program instructions or the computer programs are loaded and executed on a computer, the procedures or functions according to the embodiments are completely or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in the embodiments describes only an association condition for describing associated objects and represents that three conditions may exist. For example, A and/or B may represent the following three cases: Only A exists, both A and B exist, and only B exists. A and B may be singular or plural. In addition, the character "I" usually represents an "or" condition between the associated objects, or may represent an "and/or" condition. For details, refer to foregoing and following descriptions for understanding.

In the embodiments, "at least one" means one or more, and "a plurality of" means two or more. "At least one (piece) of the following" or a similar expression thereof means any combination of these items, including any combination of singular items (pieces) or plural items (pieces). For example, at least one (piece) of a, b, or c may represent: a, b, c, a-b, a-c, b-c, or a-b-c, where a, b, and c may be singular or plural.

In the embodiments, the terms "first", "second", and the like are intended to distinguish between different objects or distinguish between different processing of a same object, but do not indicate a particular order of the objects.

In the embodiments, the terms "include", "have", and any other variant thereof are intended to cover non-exclusive inclusion. For example, a process, a method, a system, a product, or a device that includes a series of steps or units is not limited to the listed steps or units, but further includes other unlisted steps or units in some embodiments, or further includes another inherent step or unit of the process, the method, the product, or the device in some embodiments.

In the embodiments, the word "for example" or "for example" is used to represent giving an example, an illustration, or a description. Any embodiment or scheme described as "for example" or "for example" in the embodiments should not be explained as being more preferred or having more advantages than another embodiment or scheme. Exactly, use of the word "for example" or "for example" is intended to present a related concept in a specific manner.

In the embodiments, "information", "signal", "message", "channel", "signaling", and "message" may be interchangeably used sometimes. It should be noted that meanings expressed by the terms are consistent when differences are not emphasized. Of, "corresponding (corresponding, relevant)", and "corresponding" may be interchangeably used sometimes. It should be noted that meanings expressed by the terms are consistent when differences are not emphasized.

In the embodiments, sometimes a subscript in, for example, $W_1$ may be written in an incorrect form such as W1. Expressed meanings are consistent when differences are not emphasized.

It should be understood that sequence numbers of the processes do not mean execution sequences in various embodiments. The execution sequences of the processes should be determined based on functions and internal logic of the processes and should not be construed as any limitation on the implementation processes of the embodiments.

A person of ordinary skill in the art may be aware that units and algorithm steps in the examples described with reference to the embodiments can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope.

It may be understood by a person skilled in the art that for the purpose of convenient and brief description, for a detailed working process of the foregoing described system, apparatus, and unit, reference may be made to a corresponding process in the foregoing method embodiments. Details are not described herein again.

In the several embodiments provided, it should be understood that the system, apparatus, and method may be implemented in another manner. For example, the foregoing described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of the embodiments.

In addition, function units in the embodiments may be integrated into one processing unit, or each of the units may exist alone physically, or two or more units are integrated into one unit.

When the functions are implemented in a form of a software function unit and sold or used as an independent product, the functions may be stored in a computer readable storage medium. Based on such an understanding, the technical solutions essentially, or the part contributing to the prior art, or some of the technical solutions may be implemented in a form of a computer software product. The computer software product is stored in a storage medium and includes several instructions for instructing a computer device (which may be a personal computer, a server, or a network device) to perform all or some of the steps of the methods in the embodiments. The foregoing storage medium includes any medium that can store program code, such as a USB flash drive, a removable hard disk, a, a random access memory RAM, a magnetic disk, or an optical disc.

The foregoing descriptions are merely implementations, but are not intended to limit the protection scope. Any variation or replacement readily figured out by a person of ordinary skill in the art within the scope provided shall fall within the protection scope.

What is claimed is:

1. A wireless charging method, comprising:
    transmitting, by an electronic device, a first detecting signal when the electronic device is in a wireless charging output mode;
    receiving, by the electronic device, a second detecting signal transmitted by a wireless charging device, wherein the wireless charging device is in a wireless charging output mode, the second detecting signal is received by the electronic device when the electronic device is in the wireless charging output mode and when the electronic device does not transmit the first detecting signal;
    in response to the second detecting signal, switching, by the electronic device, from the wireless charging output mode to a wireless charging input mode; and
    when the electronic device switches to the wireless charging input mode, receiving, by the electronic device, a wireless charging signal from the wireless charging device so as to receive a charging current from the wireless charging device.

2. The wireless charging method of claim 1, wherein in response to the second detecting signal, the switching, by the electronic device, from the wireless charging output mode to the wireless charging input mode, comprises:
    in response to the second detecting signal, automatically switching, by the electronic device, from the wireless charging output mode to the wireless charging input mode.

3. The wireless charging method of claim 1, further comprising:
in response to a user input, setting the electronic device to the wireless charging output mode.

4. The wireless charging method of claim 1, wherein in response to the second detecting signal, the switching, by the electronic device, from the wireless charging output mode to the wireless charging input mode, comprises:
in response to the second detecting signal meet a preset condition, switching, by the electronic device, from the wireless charging output mode to the wireless charging input mode, wherein the preset condition comprises at least one of:
a voltage of the second detecting signal is greater than a first voltage threshold;
a current of the second detecting signal is greater than a first current threshold; or
a power of the second detecting signal is greater than a first power threshold.

5. The wireless charging method of claim 1, wherein
the first detecting signal is transmitted by the electronic device through a wireless charging coil; and
the second detecting signal is received by the electronic device through the wireless charging coil.

6. The wireless charging method of claim 1, wherein a transmit frequency at which the electronic device transmits the first detecting signal is a first frequency; and a transmit frequency at which the wireless charging device transmits the second detecting signal is a second frequency, wherein the first frequency is different from the second frequency, and the first frequency is not an integer multiple of the second frequency.

7. The wireless charging method of claim 1, wherein a transmit frequency at which the wireless charging device transmits the second detecting signal is a second frequency, a transmit frequency at which the wireless charging device transmits the charging signal is a third frequency; wherein:
the second frequency is less than the third frequency, or
a transmit power of the charging signal is greater than a transmit power of the second detecting signal.

8. The wireless charging method of claim 1, wherein the second detecting signal being received by the electronic device when the electronic device is in the wireless charging output mode and when the electronic device does not transmit the first detecting signal comprises:
the second detecting signal is received by the electronic device when the electronic device is in the wireless charging output mode, and the second detecting signal is received at a gap moment between the moments at which the electronic device transmits the first detecting signal.

9. The wireless charging method of claim 1, wherein the second detecting signal being received by the electronic device when the electronic device is in the wireless charging output mode and when the electronic device does not transmit the first detecting signal comprises:
the second detecting signal is received by the electronic device when the electronic device is in the wireless charging output mode, and the second detecting signal is received at a gap moment between at least two adjacent moments at which the electronic device transmits the first detecting signal.

10. An electronic device, comprising a processor and a non-transitory computer-readable medium having processor-executable instructions stored thereon, wherein the processor-executable instructions, when executed by the processor:
transmit a first detecting signal when the electronic device is in a wireless charging output mode;
receive a second detecting signal transmitted by a wireless charging device, wherein the wireless charging device is in a wireless charging output mode and the second detecting signal is received by the electronic device when the electronic device is in the wireless charging output mode and when the electronic device does not transmit the first detecting signal;
in response to the second detecting signal, switch from the wireless charging output mode to a wireless charging input mode; and
when the electronic device switches to the wireless charging input mode, receive a wireless charging signal from the wireless charging device so as to receive a charging current from the wireless charging device.

11. The electronic device of claim 10, wherein in response to the second detecting signal, the switch from the wireless charging output mode to a wireless charging input mode, comprises:
in response to the second detecting signal, automatically switch from the wireless charging output mode to a wireless charging input mode.

12. The electronic device of claim 10, wherein the processor-executable instructions, when executed by the processor, further:
in response to a user input, set the electronic device to the wireless charging output mode.

13. The electronic device of claim 10, wherein
the first detecting signal is transmitted by the electronic device through a wireless charging coil; and
the second detecting signal is received by the electronic device through the wireless charging coil.

14. The electronic device of claim 10, wherein the second detecting signal being received by the electronic device when the electronic device is in the wireless charging output mode and when the electronic device does not transmit the first detecting signal comprises:
the second detecting signal is received by the electronic device when the electronic device is in the wireless charging output mode, and the second detecting signal is received at a gap moment between the moments at which the electronic device transmits the first detecting signal.

15. The electronic device of claim 10, wherein the second detecting signal being received by the electronic device when the electronic device is in the wireless charging output mode and when the electronic device does not transmit the first detecting signal comprises:
the second detecting signal is received by the electronic device when the electronic device is in the wireless charging output mode, and the second detecting signal is received at a gap moment between at least two adjacent moments at which the electronic device transmits the first detecting signal.

16. A non-transitory computer-readable medium having processor-executable instructions stored thereon, wherein the processor-executable instructions, when executed:
transmit a first detecting signal when the electronic device is in a wireless charging output mode;
receive a second detecting signal transmitted by a wireless charging device, wherein the wireless charging device is in a wireless charging output mode, and the second detecting signal is received by the electronic device when the electronic device is in the wireless charging output mode and when the electronic device does not transmit the first detecting signal;

in response to the second detecting signal, switch from the wireless charging output mode to a wireless charging input mode; and when the electronic device switches to the wireless charging input mode, receive a wireless charging signal from the wireless charging device so as to receive a charging current from the wireless charging device.

17. The non-transitory computer-readable medium of claim 16, wherein in response to the second detecting signal, the switch from the wireless charging output mode to a wireless charging input mode, comprises:

in response to the second detecting signal, automatically switch from the wireless charging output mode to a wireless charging input mode.

18. The non-transitory computer-readable medium of claim 16, wherein the processor-executable instructions, when executed, further:

in response to a user input, set the electronic device to the wireless charging output mode.

19. The non-transitory computer-readable medium of claim 16, wherein the first detecting signal is transmitted by the electronic device through a wireless charging coil; and the second detecting signal is received by the electronic device through the wireless charging coil.

20. The non-transitory computer-readable medium of claim 16, wherein the second detecting signal being received by the electronic device when the electronic device is in the wireless charging output mode and when the electronic device does not transmit the first detecting signal comprises:

the second detecting signal is received by the electronic device when the electronic device is in the wireless charging output mode, and the second detecting signal is received at a gap moment between the moments at which the electronic device transmits the first detecting signal.

* * * * *